Sept. 8, 1964 R. F. STELZER ETAL 3,147,912
OIL CONTROL VALVE
Original Filed Feb. 23, 1960
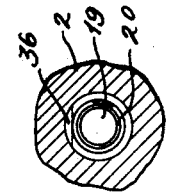
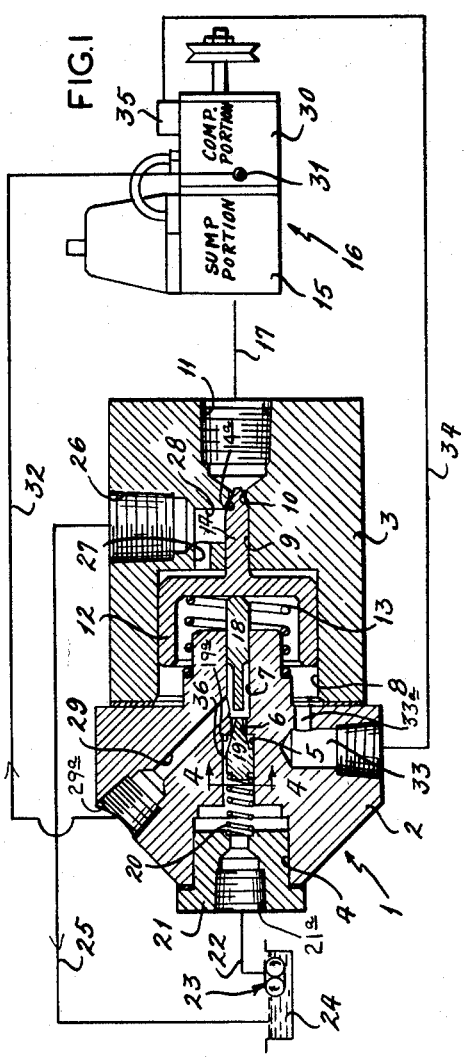
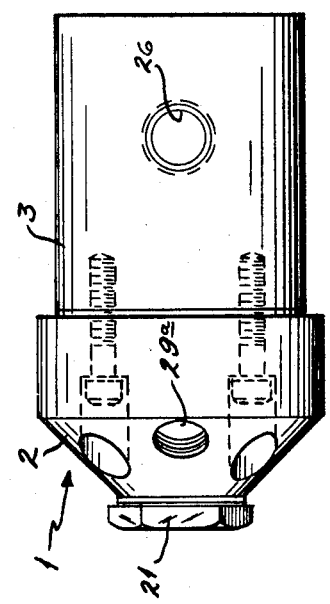
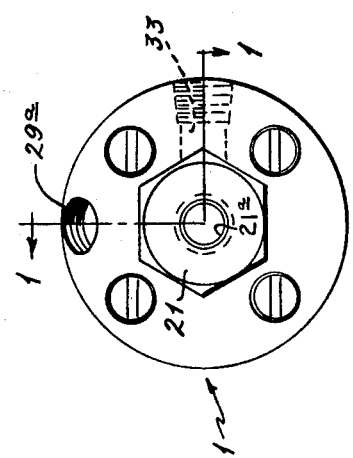
INVENTORS:
RAYMOND F. STELZER
CYRIL B. FITES
BY Joseph E. Pajur

United States Patent Office 3,147,912
Patented Sept. 8, 1964

3,147,912
OIL CONTROL VALVE
Raymond F. Stelzer, Berkeley, and Cyril B. Fites, St. John, Mo., assignors to Wagner Electric Corporation, St. Louis, Mo., a corporation of Delaware
Original application Feb. 23, 1960, Ser. No. 10,177. Divided and this application Apr. 2, 1963, Ser. No. 269,914
9 Claims. (Cl. 230—206)

The present invention relates generally to valves and more particularly to an oil control or oil lubricating valve for use in conjunction with compressors and the like.

Various lubricating devices have been devised in the past and some have even been devised for use with compressors and the like. The known devices, however, have not provided means for feeding lubricant from a circulating source directly into the compressor mechanism of a compressor and at the same time provided means for draining excess lubricant out of the compressor and feeding it back to the source. In other words, so far as is known, no one heretofore has devised means for circulating lubricant from an external source through the working mechanism of a compressor during operation thereof. To this end the present device comprises a control valve having a circulating source of lubricant connected thereto, said valve including means for connecting said source directly to the working members of a compressor or like structure, and other means for draining excess lubricant that accummulates in the compressor back to the source.

It is therefore a principal object of the present invention to provide improved means for lubricating compressors and the like.

Another object is to provide means for circulating oil from an external source through a compressor.

Another object is to provide relatively inexpensive means for lubricating a compressor or the like which can be installed as original equipment or added as an improvement to existing equipment.

Another object is to provide lubricating means which can be mounted on the equipment to be lubricated or that can be installed at a remote location therefrom.

Another object is to provide lubricating means which are controlled by changes that occur in the equipment to be lubricated.

Another object is to provide means for feeding lubricant to the working members of a device and to thereby partially relieve the load thereon.

Still another object is to provide a controlled path for circulating lubricant through a compressor or similar device.

These and other objects and advantages of the present invention will become apparent after considering the following detailed specification of a particular embodiment of the invention in conjunction with the accompanying drawing.

In the drawing:

FIG. 1 is a schematic view showing the components of an oil control valve and associated lubrication system, the control valve portion being in section as taken on line 1—1 of FIG. 2;

FIG. 2 is a left-end view of the control valve portion of the lubricant system shown in FIG. 1;

FIG. 3 is a top view of the same control valve portion; and

FIG. 4 is an enlarged fragmentary cross-sectional view taken on line 4—4 of FIG. 1.

This is a division of copending application No. 10,177, filed February 23, 1960, for Oil Control Valve.

Referring to the drawing more particularly by reference numbers, the number 1 refers to an oil control valve constructed according to the present invention. The valve 1 has two connected housing portions 2 and 3, and a plurality of different sized connected passages or bores extending therethrough. These connected bores are numbered in order from left to right as the bores 4, 5, 6, 7, 8, 9, 10 and 11.

The bore 8 is the largest of the connected bores and slidably receives a piston member 12. A compression spring 13 is positioned in the bore 8 between the left end of the bore 8 and the left side of the piston 12 urging the piston 12 rightwardly into a normally closed position in which a rightwardly extending portion or valve 14 thereof, which is slidably positioned in the bore 9, engages a valve seating surface 14a formed at the junction between the bores 9 and 10. The bore or sump port 11 which is the rightmost bore is connected to an oil sump portion 15 of a compressor 16 by a conduit 17 and provides a return path or drain off path for excessive lubricant in the sump as will be shown.

A push rod 18 is slidably positioned in the bore 7 to the left of the piston 12. The push rod 18 is interposed between the piston 12 on its right and a valve member 19 on its left. The valve member 19 is slidably positioned in the bore 6 and is biased into a sealable engagement with a valve seat 19a formed at the junction of bores 5 and 6 by a compression spring 20 which is positioned between the left end of the member 19 and a fitting member 21 fixedly positioned in the bore 4.

The fitting member 21 has a passage or inlet port 21a therethrough which is connected by a conduit 22 to the output side of an oil pump 23, and the oil pump 23 is fed by a reservoir 24 associated therewith. The reservoir 24 in turn is fed by a conduit 25 which has one of its ends connected to a return port 26 in the valve housing portion 3. The return port 26 communicates with the bore 8 on the right side of the piston 12 through a passage 27, and also communicates with the bore 9 through a passage 28.

Another passage 29 extends through the housing portion 2 between an outlet port 29a and the bore 7 adjacent to the left side of the push rod 18. The outlet port 29a is the principal outlet for the valve 1 and is connected to a pressure side or compression portion 30 of the compressor 16 at 31 by a conduit 32.

To complete the description of the components of the valve 1, a passage or control port 33 intersects with a passage 33a and are provided and are used for controlling the operation of the valve. The passage 33 is connected by a conduit 34 to a control valve 35 for the compressor 16. The passages 33 and 33a also communicate the compressor control valve 35 with the bore 8 on the left side of the piston 12. The control valve 35, which forms no part of this invention, operates the valve 1 by establishing a partial vacuum in the bore 8 on the left side of the piston 12 which thereby establishes a pressure differential across the piston 12 and causes the piston 12 to move leftwardly to an open position as will be shown.

It should also be noted that the valve member 19 is provided with one or more marginal output portions 36 which facilitate movement thereof in the bore 5 and provide means for lubricant to move thereby when open. It is also necessary to provide some means for unloading the pump 23 when the valve member 19 is in closed position. In the usual situation the subject valve is employed on an engine or the like, and the pump 23 supplies lubricant to a number of devices including the subject compressor. One of the other devices (not shown) provides the open return path necessary for unloading the pump.

The oil control valve 1 is shown for illustrative purposes remotely positioned relative to the compressor 16, but it is contemplated to connect the two units directly as by mounting the valve on the compressor without changing the basic idea of the invention, and in some cases this may actually be preferred.

During the "On" or compression cycle of the compressor 16, which is when the compressor is compressing air, the control passage 33 is vented to atmosphere through the compressor control valve 35. Since the control valve 35 is not a part of the present invention, the details of its construction and operation are only generally described. When the passage 33 is vented to atmosphere, however, it is sufficient to note that the piston 12 is in its rightward closed position as shown in FIG. 1. This is so because the right side of the piston 12 is always vented to atmosphere through the passage 27 and the conduit 25, and there is therefore substantially no pressure differential across the piston 12 to move the piston leftwardly. Therefore, at this time the piston 12 is held in the rightward position by the compression spring 13.

In the rightward position of the piston 12, the rightwardly extending valve portion 14 seats against the junction between the boxes 9 and 10 and prevents communication between the compressor oil sump 15 and the reservoir 24 via the conduits 17 and 25. Furthermore, in the closed position of the valve as described, the compression spring 20 urges the valve member 19 into a rightward seated position with the seat 19a and prevents the output of the pump 23 from flowing to the compressor 16 through the passage 29 and the conduit 32.

When, however, the compressor 16 changes to its "Off" or non-compression cycle, which is under control of the control valve 35, the control valve 35 causes a partial vacuum to be created in the bore 8 on the left side of the piston 12. This partial vacuum establishes a pressure differential across the piston 12 since the right side thereof is at atmospheric pressure. This causes the piston 12 to move leftwardly in opposition to the force of the compression spring 13. In so doing the piston 12 engages the push rod 18 and moves the push rod 18 leftwardly until it engages the valve member 19. Thereafter, further leftward movement of the piston 12 and push rod 18 unseats the member 19 and provides an open path for lubricant to flow from the pump 23 to the compressor 16. The fluid flow path thus established is from the pump 23, into the inlet port 21a, the bore 4, the bore 5, and via the cutout 36, bores 6 and 7, passage 29, outlet port 29a and conduit 32 to the inlet port 31 on the compressor.

It will be readily understood that during the compression cycle of the compressor 16, the lubricant in the compressor is mixed with the air being compressed and thereafter again separated from the compressed air by suitable means in the compressor (not shown) and allowed to drain into the sump portion 15. It is one of the purposes of this invention to maintain the level of the lubricant in the sump 15 at a predetermined desirable level by draining off the overage in the sump 15 and feeding it back to the reservoir 24 for recirculation. This is done by gravity through the conduit 17 which is attached to the compressor sump at the desired lubricant level and by a pressure differential between the slightly pressurized oil sump 15 and substantially atmospheric reservoir 24. The lubricant flows from the sump 15 into the conduit 17, the sump port 11, the bores 10 and 9, which are opened when the valve 14 is disengaged from the seat 14a, and then flows through the passage 28, the return port 26, and finally by conduit 25 feeds to the oil reservoir 24.

The push rod 18 is shorter than the distance between the valve members 12 and 19 when the valve is closed as shown in FIG. 1. Therefore, when a valve operation is initiated this play or free motion of the push rod 18 means that the return path for lubricant from the sump 15 to the reservoir 25 will be established before the feed path from the pump 23 to the compressor portion 30. This is desirable because it means that the pressure in the sump 15 which is on the output side of the compressor will be partially dissipated before lubricant is fed to the compressor thereby partially relieving the load on the pump 23.

When the compressor 16 again reverts to the "On" cycle, the passage 8 on the left side of the piston 12 is again vented to atmosphere and the springs 13 and 20 restore their respective valve members 14 and 19 to closed positions as described above.

It is now apparent that there has been shown and described novel control means for supplying lubricant to a compressor or the like, said means comprising valve means for controlling the flow of lubricant from a source to the compressor and other valve means for controlling the flow of lubricant from the compressor back to the source to thereby maintain a predetermined lubricant level in the compressor.

Many changes, modifications and alterations of the present device will become apparent to those skilled in the art after considering this specification and the accompanying drawings. All such changes, modifications and alterations, however, which do not depart from the spirit or scope of the invention are deemed to be covered by the invention which is limited only by the claims which follow.

What we claim is:

1. A lubrication system comprising a pressurized lubricant source, a compressor including interconnected lubricant sump and compression portions, delivery and return branches connected between said source and compressor compression portion and between said compressor sump portion and source, a pair of valve means for controlling lubricant flow through said delivery and return branches, valve operating means engaged with one of said valve means and adapted for lost motion engagement with the other of said valve means, and control means for said compressor and said valve operating means periodically subjecting said valve operating means to an operating pressure, said valve operating means being initially movable in response to the operating pressure to move said one valve means to a position establishing lubricant flow through said return branch and said valve operating means being further movable into lost motion engagement with said other valve means to subsequently move said other valve means to a position establishing lubricant flow through said delivery branch.

2. A lubrication system comprising a pressurized lubricant source, a compressor including interconnected lubricant sump and compression portions, delivery and return branches connected between said source and compressor compression portion and between said compressor lubricant sump portion and source, a lubrication control valve connected in said delivery and return branches for controlling lubricant flow therethrough including a pair of valve means normally urged to positions interrupting lubricant flow through said branches, valve operating means in said lubricant control valve for operative engagement with said valve means, control means for said compressor periodically establishing sub-atmospheric pressure therein to control the pressurization of said compressor compression and lubricant sump portions, and means for subjecting said valve control means to the sub-atmospheric pressure periodically established in said compressor control means, said valve control means being responsive to sub-atmospheric pressure in said compressor control means to initially move one of said valve means to a position in said lubrication control valve establishing lubricant flow through said return branch and thereafter move the other of said valve means to a position in said lubricant control valve establishing lubricant flow through said delivery branch.

3. A lubrication system comprising a pressurized lubricant source, a compressor including interconnected lubricant sump and compression portions, delivery and return branches for lubricant connected between said source and compressor compression portion and between said compressor lubricant sump portion and source, a lubrication control valve connected in said delivery and return branches for controlling lubricant flow therethrough including a pair of valve means normally urged to closed positions in said delivery and return branches, valve operation means defining in said lubrication control valve a control chamber between said valve means, said valve operating means being engaged with one of said valve means and adapted for lost motion engagement with the other of said valve means, compressor control means for periodically effecting atmospheric and sub-atmospheric pressure fluctuations to control the pressurization of said compressor compression and lubricant sump portions, and means for subjecting said chamber to the periodic pressure fluctuations of said compressor control means, said valve control means being initially movable in response to sub-atmospheric pressure in said chamber to move one of said valve means to an open position and thereafter movable into lost motion engagement with the other of said valve means to move said other valve means to an open position thereby establishing lubricant flow through said branches.

4. A lubrication system comprising a pressurized lubricant source, a compressor including interconnected lubricant sump and compression portions, delivery and return branches connected between said sources and compressor compression portion and between said compressor lubricant sump portion and said source, a lubrication valve including a housing, means within said housing defining a pair of lubricant flow passages respectively connected in said delivery and return branches, a pair of valve means in said flow passages and controlling lubricant flow therethrough, a valve control member movable in said housing for operative engagement with said valve means, means within said housing including said valve control member defining a fluid pressure control chamber, compressor control means periodically effecting atmospheric and sub-atmospheric pressure fluctuations for controlling the pressurization of said compressor compression and lubricant sump portions, and means connected between said compressor control means and said control chamber for subjecting said control chamber to the pressure fluctuations of said compressor control means, said valve control member being movable in response to sub-atmospheric pressure in said control chamber to move said valve means to positions in said flow passages establishing lubricant flow therethrough and through said delivery and return branches.

5. A lubrication system comprising a pressurized source, a compressor including interconnected compression and lubricant sump portions, a lubrication valve for said compressor including a housing, means within said housing defining a pair of separate lubricant flow passages, connection means for connecting one of said flow passages between said source and compressor compression portions and other connection means for connecting the other of said flow passages between said source and compressor lubricant sump portion, a pair of valve means normally urged to positions in said flow passages interrupting lubricant flow therethrough, a valve control member movable in said housing and defining therewith a control chamber, said valve control member being connected with one of said valve means and adapted for lost motion engagement with the other of said valve means, compressor control means for periodically effecting atmospheric and sub-atmospheric pressure fluctuations to control the pressurization of said compressor compression and lubricant sump portions, and means for connecting said control chamber with the periodic pressure fluctuations of said compressor control means, said valve control member being initially movable in response to sub-atmospheric pressure in said control chamber to move said one valve means to a position in one of said flow passages establishing lubricant flow therethrough and thereafter movable into lost motion engagement with said other valve means to move said other valve means to a position in the other of said flow passages to establish lubricant flow therethrough subsequent to the establishment of lubricant flow through said one flow passage.

6. A lubrication system comprising a pressurized source, a compressor including interconnected compression and lubricant sump portions, a lubrication valve for said compressor including a housing, first and second passages in said housing, connection means for connecting said first passage in lubricant flow communication between said source and said compressor compression portion, other connection means for connecting said second passage in lubricant flow communication between said compressor sump portion and said source, first and second valve means normally urged to positions closing said first and second passages and interrupting lubricant flow communication therethrough, a bore in said housing between said first and second passages, a valve control member slidable in said bore and defining therewith a pressure fluid chamber, said valve control member being connected with said second valve means and adapted for lost motion engagement with said first valve means, compressor control means for periodically establishing atmospheric and sub-atmospheric pressures to control the pressurization of said compressor compression and lubricant sump portions, and means for connecting said control chamber in communication with the atmospheric and sub-atmospheric pressure fluctuations of said compressor control means, said valve control member being initially movable in response to sub-atmospheric pressure in said control chamber to move said second valve means to an open position in said second flow passage establishing lubricant flow communication therethrough from said compressor lubricant sump portion to said source and said valve control member being thereafter movable into lost motion engagement with said first valve means to move said first valve means to an open position in said first flow passage establishing lubricant flow communication therethrough from said source to said compressor compression portion in a time sequence subsequent to that established through said second flow passage.

7. A lubrication system comprising a pressurized lubricant source, a compressor including interconnected compression and lubricant sump portions, compressor control means periodically effecting atmospheric and sub-atmospheric pressure fluctuations for controlling the pressurization of said compressor compression and lubricant sump portions, a lubrication valve for said compressor including a housing, first and second lubricant flow passages in said housing, first and second connection means for connecting said first and second flow passages in lubricant flow communication between said source and compressor compression portion and between said compressor lubricant sump portion and source, respectively, first and second valve seats in said first and second flow passages, first and second valve means in said first and second flow passages and normally urged into engagement with said first and second valve seats, a valve control member slidable in said housing between said first and second valve seats, said valve control member being connected with said second valve means and adapted for lost motion engagement with said first valve means, a pressure fluid chamber in said housing adjacent to one side of said valve control member, and other means for connecting said chamber in open pressure fluid communication with the periodic pressure fluctuations of said compressor control means, said valve control member being initially movable in response to sub-atmospheric pressure in said chamber to disenage said second valve means from said second valve seat and establish lubricant flow communication from said compressor lubricant sump portions to said source and said valve control member being further movable in response to sub-atmospheric pressure in said chamber into lost motion engagement with said first valve means to disengage said first valve means from said first valve seat and establish lubricant flow communication from said source through said first flow passage and connection means to said compressor compression portion subsequent to the establishment of lubricant flow communication between said compressor lubricant sump portion and said source.

8. A lubrication system comprising a lubricant pump and reservoir, a compressor including interconnected compression and lubricant sump portions, a lubrication valve for said compressor including a housing having first and second lubricant flow passages therein, first and second connection means for connecting said first and second flow passages in lubricant flow communication between said pump and said compression compressor portion and between said compressor lubricant sump portion and said reservoir, respectively, first and second valve seats in said first and second flow passages, a first valve member normally urged into engagement with said first valve seat to close said first flow passage and interrupt lubricant flow communication between said pump and compressor compression portion, a piston having opposed faces and slidable in said housing between said first and second valve seats, said piston defining with said housing opposed first and second chambers adjacent to said opposed piston faces, said second chamber being in open communication with said second passage between said second valve seat and piston, a second valve member on said piston, said piston being normally urged in a direction to engage said second valve member with said second valve seat to close said second passage and interrupt lubricant flow communication between said compressor lubricant sump portion and said reservoir, a valve operating member slidable in said housing between said first passage and first chamber and adapted for lost motion engagement between said first valve member and piston, compressor control means periodically effecting atmospheric and sub-atmospheric pressures for controlling the pressurization of said compressor compression and lubricant sump portions, and third connection means for connecting said first chamber in open pressure fluid communication with said compressor control means and subjecting said first chamber to the periodic pressure fluctuations of said compressor control means, said piston being initially movable in response to sub-atmospheric pressure in said first chamber to disengage said second valve member from said second valve seat to open said second passage and establish lubricant flow communication therethrough from said compressor lubricant sump portion to said reservoir and said piston being further movable into lost motion engagement with said valve operating member to effect movement thereof in a direction to subsequently disengage said first valve member from said first valve seat to open said first flow passage and establish lubricant flow communication therethrough from said pump to said compressor compression portion.

9. A lubrication system comprising a pump having the suction side thereof connected with a lubricant reservoir, a compressor including interconnected compression and lubricant sump portions, a lubrication valve for said compressor including a housing having an inlet port connected with the discharge side of said pump, an outlet port connected with said compressor compression portion, a sump port connected with said compressor lubricant sump portion, and a return port connected with said reservoir, first and second passages in said housing between said inlet and outlet ports and between said sump and return ports, first and second valve seats in said first and second passages, a first valve member slidable in said first passage between said inlet port and first valve seat and normally urged into engageemnt with said first valve seat, a piston having opposed faces thereon and slidable in said housing between said first and second passages, said piston defining with said housing first and second chambers adjacent to said opposed piston faces, respectively, a first housing bore connecting said first chamber with said first passage between said first valve seat and outlet port, a second housing bore connecting said second chamber with said second passage between said second valve seat and return port, an extension on said piston extending into said second housing bore and having an end portion thereon defining a second valve member, said second chamber being in open communication with said return port, a spring in said first chamber between said housing and piston and normally urging said piston and extension in a direction to engage said second valve member with said second valve seat, a control port in said housing connected with said first chamber, compressor control means periodically effecting atmospheric and sub-atmospheric pressure fluctuations for controlling the pressurization of said compressor compression and lubricant sump portions, other means for connecting said control port in open pressure fluid communication with said compressor control means to subject said first chamber to the periodic pressure fluctuations of said compressor control means, and a valve control member slidable in said first bore and interrupting lubricant flow communication between said first passage and first chamber, said valve control member having a pair of opposed free ends in said first passage and first chamber for lost motion engagement between said first valve member and piston, respectively, said piston being movable against said spring in response to sub-atmospheric pressures in said first chamber to initially disengage said first valve member from said second valve seat and establish open lubricant flow communication from said compressor lubricant sump portion through said sump and return ports and said second passage to said reservoir and said piston means being thereafter movable into engagement with one of said valve control members free ends to move said valve control member and the other free end thereof into lost motion engagement with said first valve member to subsequently disengage said first valve member from said first valve seat and establish open lubricant flow communication from said pump through said inlet and outlet ports and said first passage to said compressor compression portion.

References Cited in the file of this patent

UNITED STATES PATENTS 1,789,841    Rennick _____ Jan. 20, 1931